Patented Mar. 2, 1954

2,671,054

UNITED STATES PATENT OFFICE 2,671,054

PURIFICATION OF PHTHALIC ANHYDRIDE

Albert H. Bump, Brewster, Ralph Marotta, Malden, and Robert D. Swisher, Winchester, Mass., assignors to Monsanto Chemical Company, St. Louis, Mo., a corporation of Delaware No Drawing. Application August 20, 1952, Serial No. 305,498

16 Claims. (Cl. 202—57)

The present invention relates to improvements in the purification of crude phthalic anhydride and particularly in the purification of crude phthalic anhydride which is prepared by the vapor phase catalytic oxidation of naphthalene.

Crude phthalic anhydride and particularly that which is prepared by the vapor phase catalytic oxidation of naphthalene contains various impurities, the exact nature of which have not been thoroughly determined or understood. It is generally recognized that the quantities and nature of such impurities which are present in the crude vary considerably from batch to batch and from day to day and are not usually amenable to all types of chemical purification. A number of chemical compounds have been suggested for use in the treatment of such crudes, which chemicals supposedly fix the impurities in the crude in a more or less non-volatile form and allow the removal of the more volatile phthalic anhydride by distillation. Although some of these chemical treatments are successful with crudes which contain small amounts of impurities or impurities which are rendered substantially non-volatile by the treatment, they are generally unsatisfactory in commercial operations especially when the crude contains fluctuating amounts and types of impurities. Moreover, the chemical compounds which have been suggested, heretofore, are generally objectionable in that they are either difficult to handle under the conditions of operation or they react with the phthalic anhydride to such an extent that the yield of phthalic anhydride is reduced.

Phthalic anhydride must be generally free from objectionable odor, be substantially colorless, and have good resistance to discoloration on heating before it is suitable for use in the manufacture of high quality alkyd resins, or high quality phthalic ester plasticizers and the like. In general, chemical purifications of crudes with a single chemical treatment have not been successful, heretofore, for the preparation of such a product, but such product is readily obtained according to the method of the invention as disclosed herein.

One object of the invention is to provide a method of chemically purifying crude phthalic anhydrides, which method is simple and efficient and yields a purified phthalic anhydride which has a satisfactory color, is free from objectionable odor, and which is resistant to discoloration on heating or in storage.

A further object of the invention is to provide a simple purification method involving the use of a single chemical treatment which is particularly adapted for the purification of crude phthalic anhydride which has been prepared by the vapor phase catalytic oxidation of naphthalene.

Still further objects and advantages of the invention will appear from the following description and the appended claims.

The invention is practiced, in general, by heating a crude phthalic anhydride which need not have been subjected to any antecedent chemical purification treatment, preferably crude phthalic anhydride which is prepared by the vapor phase catalytic oxidation of naphthalene, and a small proportion of an alkaline sodium and/or alkaline lithium salt of an inorganic acid at a temperature substantially above 250° C., but not substantially in excess of the boiling point of phthalic anhydride at atmospheric pressure and without substantial loss of phthalic anhydride vapor, and then separating phthalic anhydride therefrom in a purified form by fractional distillation, that is, as a product which is substantially free of objectionable odor, is resistant to discoloration on heating or in storage, and which is substantially colorless.

In carrying out such purification, the quantity of such alkaline sodium and/or alkaline lithium salt used, the duration of the treatment period and the method of separation of the purified phthalic anhydride employed, will vary to some extent depending upon the type of crude treated and the quantity and nature of the impurities contained therein. Moreover, these factors will also vary to some extent if the treatment is practiced on a crude phthalic anhydride which has been given a preliminary distillation or distillations.

It is generally desirable to carry out such chemical purification by employing at least 0.0001 mol of such basic sodium and/or basic lithium salt per mol of phthalic anhydride in the crude and to subject this mixture to a temperature substantially above 250° C., preferably above 275° C. and not substantially in excess of the boiling point of phthalic anhydride at standard atmospheric pressure (B. P. about 285° C.) without substantial loss of phthalic anhydride vapor, for a period of at least 30 minutes, and then fractionally distilling phthalic anhydride from the mixture at sub-atmospheric pressure.

If heating is carried out for a period of about 30 minutes to about 1.5 hours, it is desirable to collect and remove the first small fraction, for example about 5% by weight or less of the treated phthalic anhydride, which fraction contains some color impurities, and then collect the subsequent fractions as one distillate. By operating in this manner the bulk of the distillate, that is, up to about 95% by weight or more of the treated phthalic anhydride, is generally obtained as a product having a color between 0 and 50, in the liquid form as measured on the Platinum-Cobalt (Hazen) Color Standard, which means that the product is substantially colorless. The precise color value with the above range will depend on the amount of alkaline salt used and the amount of impurities present in the crude. This product has good resistance to discoloration on heating, and its color in the liquid state generally does not exceed about 125 as measured on the Platinum-Cobalt (Hazen) Color Standard after heating for 1½ hours at 250° C. This means that the bulk of the distillate is useful for the preparation of exceptionally light colored alkyd resins or phthalic ester plasticizers.

On the other hand, if the heating of the crude phthalic anhydride and the alkaline sodium or lithium salt is carried out for a period of about 1.5 hours and longer and is followed by fractional distillation, the entire distillate may be collected as a single distillate without the separation or removal of any fractions. By operating in this manner it is possible to obtain distillates having a color between 0 and about 50 in the liquid state as measured on the Platinum-Cobalt (Hazen) Color Standard, which means that the distillate is substantially colorless. The precise value obtained within the above range will depend on the amount of alkaline salt used and the amount of impurities in the crude anhydride. The distillate thus obtained has good resistance to discoloration on heating. For example, its color generally does not exceed about 125 in the liquid state as measured on the Platinum-Cobalt (Hazen) Color Standard after heating for 1½ hours at 250° C. This means that the phthalic anhydride purified in this manner is satisfactory for the production of exceptionally light colored alkyd resins or phthalic ester plasticizers.

The alkaline sodium and/or lithium salts of an inorganic acid as employed herein have a pH above 7.5 when measured as a 0.1 molar solution in distilled water. Neutral and acid sodium and/or lithium salts of an inorganic acid having a pH below about 7.5 in a distilled water solution, are, therefore, specifically excluded. As examples of alkaline sodium and/or alkaline lithium salts which are employable in the practice of the invention may be mentioned: $Na_2CO_3$, $Li_2CO_3$, $Na_2SO_3$, $Li_2SO_3$, $NaHCO_3$, $Na_2HPO_4$, $Na_3PO_4$, $Li_3PO_4$, $Na_2B_4O_7$, $Li_2B_4O_7$ and the like.

In general, at least 0.0001 mol of such alkaline sodium and/or alkaline lithium salt, on an anhydrous basis, per mol of phthalic anhydride in the crude is required in carrying out the chemical purification described herein while the use of from 0.0002 to 0.01 mol per mol of phthalic anhydride in the crude is preferred for most crudes. Larger amounts of such alkaline salt may be used, if desired. However, the use of larger quantities is generally not required and when used may result in a decreased yield of phthalic anhydride.

The alkaline salts as used herein may be employed in the anhydrous state, or in the form of concentrated aqueous solutions or in the form of crystals containing water of crystallization. However, the use of anhydrous or substantially anhydrous alkaline salts is preferred.

In a preferred embodiment of the invention crude phthalic anhydride, which has been prepared by the vapor phase catalytic oxidation of naphthalene, is heated above its melting point and from about 0.0002 to 0.01 mol of $Na_2CO_3$, $Na_2SO_3$ or $Na_3PO_4$ per mol of phthalic anhydride in the crude is added thereto and the mixture is heated substantially at the boiling point at atmospheric pressure under reflux, for a period of from about 1.5 to 6 hours and the purified phthalic anhydride is removed by fractional distillation at an absolute pressure below about 500 mm. of mercury and is collected as a single distillate. This method can also be employed with equal facility in the purification of a crude which has been preliminarily distilled. Although longer heating periods may be used, a heating period in excess of 6 hours is generally not necessary.

The following examples are specific embodiments which illustrate the practice of the invention, parts and percentages being by weight unless otherwise specified.

*Example I*

To 100 parts of crude molten phthalic anhydride, which had been prepared by the vapor phase catalytic oxidation of naphthalene and had not been subjected to any antecedent purification treatment, was added 0.05 part of $Na_2CO_3$. The melt was heated to its boiling point at atmospheric pressure (about 285° C.) and boiled under reflux for about 5 hours. The phthalic anhydride was then distilled by fractional distillation at an absolute pressure of 235 mm. of mercury.

In the molten state, this purified phthalic anhydride has an agreeable odor, free of off ordor constituents, has a color of 0–10 on the Patinum-Cobalt (Hazen) Color Standard and is stable to heat when heated at 250° C. for about 1½ hours in Pyrex glass without appreciable change of color or odor. The solidified product is stable when stored in the absence of light without substantial change of color or odor and is suitable for the manufacture of high grade alkyd resins and phthalic ester plasticizers.

The Platinum-Cobalt (Hazen) Color Standard referred to herein is described at page 71, 1939 ed., of "Physical and Chemical Examination of Paints, Varnishes, Lacquers and Colors" by Henry A. Gardner, published by the Institute of Paint and Varnish Research, Washington, D. C.

*Example II*

A crude phthalic anhydride, which had been prepared by the vapor phase catalytic oxidation of naphthalene, was distilled at reduced pressure and the distilled product was boiled under reflux at atmospheric pressure (about 285° C.) together with 0.01% of $Na_2CO_3$, based on the distilled product, for about 2 hours. The mixture was fractionally distilled at an absolute pressure of about 300 mm. of mercury.

The purified phthalic anhydride so prepared has substantially the same odor, color and stability characteristics and utility as that prepared in Example I.

*Example III*

A crude phthalic anhydride, which had been prepared by the vapor phase catalytic oxidation of naphthalene, and 1.0% of $Na_2SO_3$, based on the crude, were heated at 275° C. under a reflux condenser for a period of about 5 hours. The mixture was then fractionally distilled at an absolute pressure of 235 mm. of mercury.

In molten state, the phthalic anhydride, so purified, has an agreeable odor, a color of 0–10 on the Platinum-Cobalt (Hazen) Color Standard and is stable to heat when heated at 250° C. for about 1½ hours in Pyrex glass, without appreciable change of color or odor. The solidified product is stable when stored in the absence of light without substantial change of color or odor and is suitable for the manufacture of high grade alkyd resins and phthalic ester plasticizers.

Example IV

To 100 parts of crude phthalic anhydride, which had been prepared by the vapor phase catalytic oxidation of naphthalene, was added 0.008 part of $Li_2CO_3$ and the mixture was boiled under reflux at atmospheric pressure for a period of 6 hours. The mixture was then fractionally distilled at an absolute pressure of 300 mm. of mercury.

The purified phthalic anhydride obtained in such manner had substantially the same odor, color and stability characteristics, and utility as that prepared in Example I.

Example V

A crude phthalic anhydride, which had been prepared by the vapor phase catalytic oxidation of naphthalene, was boiled under reflux at atmospheric pressure, together with 0.035% of $Na_3PO_4$, based on the phthalic anhydride in the crude, for a period of 6 hours. This mixture was then fractionally distilled at an absolute pressure of 200 mm. of mercury.

The phthalic anhydride purified in this manner had an agreeable odor, a color of 0–10 on the Platinum-Cobalt (Hazen) Color Standard, was stable (without change of color or odor) on heating at 250° C. for 1½ hours in a Pyrex tube and was stable on storage, in the absence of daylight, without substantial change in odor or color. This product was also suitable for the manufacture of high quality alkyd resins and phthalic ester plasticizers.

Example VI

A crude phthalic anhydride, which had been prepared by the vapor phase catalytic oxidation of naphthalene and which had not been subjected to any antecedent purification treatment, was heated until a molten mass (about 135° C.) was obtained, after which 0.25% by weight of sodium carbonate, based on the phthalic anhydride, was added to the molten anhydride with agitation. The resulting mixture was then heated under a reflux condenser to the boiling point of phthalic anhydride at atmospheric pressure (about 284° C.) with continuous stirring. After the boiling temperature was reached, which required about 10 minutes, the molten mass was maintained at the boiling temperature for 30 minutes and was then fractionally distilled through a fractionating column at an absolute pressure of 235 millimeters of mercury.

The first small fraction obtained, which amounted to about 5.7% by weight of the total batch treated and which had a color of about 1000 as measured on the Platinum-Cobalt (Hazen) Color Standard, was collected separately and was subsequently added to another batch of crude phthalic anhydride. The remainder of the fractions were collected as a single distillate which had a color, in the liquid state, of about 20 as measured on the Platinum-Cobalt (Hazen) Color Standard. This product had an agreeable odor and its color, in the liquid state, only increased to about 50 as measured on the Platinum-Cobalt (Hazen) Color Standard after heating for 1½ hours at 250° C. in a Pyrex tube.

Example VII

A crude phthalic anhydride, which had been prepared by the vapor phase catalytic oxidation of naphthalene and which had not been subjected to any antecedent purification treatment, was first heated under a reflux condenser to the boiling point of phthalic anhydride at atmospheric pressure (about 284° C.) with continuous stirring, after which 0.25% of sodium carbonate, based on the phthalic anhydride was added. The molten mass was then maintained at the boiling temperature for 1.5 hours. The crude phthalic anhydride treated in this manner was fractionally distilled through a fractionating column at an absolute pressure of 222 millimeters of mercury.

All of the distillate obtained from the fractional distillation of the crude mixture was collected as a single distillate. This distillate, in the liquid state, had a color of 10 as measured on the Platinum-Cobalt (Hazen) Color Standard and also had an agreeable odor. After heating the distillate for 1½ hours at 250° C. in a Pyrex tube, the color of the distillate, in the liquid state, had only increased to about 20 as measured on the Platinum-Cobalt (Hazen) Color Standard. This purified phthalic anhydride was suitable for the manufacture of alkyd resins or phthalic ester plasticizers of exceptionally low color.

Various modifications and changes may be made in the processes described herein as will be apparent to those skilled in the art to which this invention appertains without departing from the spirit and intent of this invention. Accordingly, it is to be understood that it is not intended to limit this invention except by the scope of the appended claims.

This application is a continuation-in-part of our prior application Serial No. 10,174, now abandoned, filed February 21, 1948.

What is claimed is:

1. A method of purifying crude phthalic anhydride which consists in heating a mixture of (1) a crude phthalic anhydride which contains color and odor impurities and has not been subjected to any antecedent chemical purification treatment and (2) a small proportion of a salt selected from the group consisting of alkaline sodium salts of an inorganic acid and alkaline lithium salts of an inorganic acid at a temperature above 275° C. but not substantially in excess of the boiling point of phthalic anhydride at atmospheric pressure for periods of about 1.5 hours and longer, said salt being further characterized in that a 0.1 molar solution thereof in distilled water has a pH above 7.5, and then fractionally distilling phthalic anhydride from the mixture at sub-atmospheric pressure, whereby a distillate is obtained which is substantially colorless and is resistant to change of color on heating.

2. A method of purifying crude phthalic anhydride which consists in heating a mixture of (1) a crude phthalic anhydride prepared by the vapor phase catalytic oxidation of naphthalene and which has not been subjected to any antecedent chemical purification treatment and (2) at least 0.0001 mol of a salt selected from the group consisting of alkaline sodium salts of an inorganic acid and alkaline lithium salts of an inorganic acid per mol of said crude anhydride at a temperature above 275° C. but not substantially in excess of the boiling point of phthalic anhydride at atmospheric pressure for periods of about 1.5 hours and longer without substantial loss of phthalic anhydride vapor, said salt being further characterized in that a 0.1 molar solution thereof in distilled water has a pH above 7.5, and then fractionally distilling phthalic anhydride from the mixture at sub-atmospheric pressure, whereby a distillate is obtained which is substantially colorless and is resistant to change of color on heating.

3. A method of purifying crude phthalic anhydride which consists in heating a mixture of (1) a crude phthalic anhydride prepared by the vapor phase catalytic oxidation of naphthalene and which has not been subjected to any antecedent chemical purification treatment and (2) from 0.0002 to 0.01 mol of a salt selected from the group consisting of alkaline sodium salts of an inorganic acid and alkaline lithium salts of an inorganic acid per mol of said crude anhydride at the boiling point of phthalic anhydride at atmospheric pressure for a period of about 1.5 to 6 hours without substantial loss of phthalic anhydride vapor, said salt being further characterized in that a 0.1 molar solution thereof in distilled water has a pH above 7.5, and then separating phthalic anhydride from the mixture by fractional distillation at an absolute pressure below 500 millimeters of mercury, whereby a distillate is obtained which is substantially colorless and is resistant to change of color on heating.

4. A method according to claim 3, but further characterized in that said salt is $Na_2CO_3$.

5. A method according to claim 3, but further characterized in that said salt is $Na_2SO_3$.

6. A method according to claim 3, but further characterized in that said salt is $Na_3PO_4$.

7. A method of purifying crude phthalic anhydride which consists in heating a mixture of (1) a crude phthalic anhydride which contains color and odor impurities and has not been subjected to any antecedent chemical purification treatment and (2) a small proportion of a salt selected from the group consisting of alkaline sodium salts and alkaline lithium salts of an inorganic acid at a temperature above 275° C. but not substantially in excess of the boiling point of phthalic anhydride at atmospheric pressure for a period of at least 30 minutes, said salt being further characterized in that a 0.1 molar solution thereof in distilled water has a pH above 7.5, and then fractionally distilling phthalic anhydride from the mixture at sub-atmospheric pressure, collecting and removing the first fraction, which contains colored impurities, and then collecting the remainder of the fractions, whereby a substantial portion of the phthalic anhydride is recovered in a substantially colorless and heat-stable form.

8. A method of purifying crude phthalic anhydride which consists in heating a mixture of (1) a crude phthalic anhydride prepared by the vapor phase catalytic oxidation of naphthalene and which has not been subjected to any antecedent chemical purification treatment and (2) from about 0.0002 to 0.01 mol of a salt selected from the group consisting of alkaline sodium salts and alkaline lithium salts of an inorganic acid per mol of said crude anhydride at a temperature above 275° C. but not substantially in excess of the boiling point of said mixture at atmospheric pressure for a period of at least 30 minutes without substantial loss of phthalic anhydride vapor, said salt being further characterized in that a 0.1 molar solution thereof in distilled water has a pH above 7.5, and then fractionally distilling phthalic anhydride from the mixture at sub-atmospheric pressure, collecting and removing the first fraction, which contains colored impurities, and then collecting the remainder of the fractions, whereby a substantial portion of the phthalic anhydride is recovered in a substantially colorless and heat-stable form.

9. A method of purifying crude phthalic anhydride which consists in heating a mixture of (1) a crude phthalic anhydride which contains color and odor impurities and has not been subjected to any antecedent chemical purification treatment and (2) from about 0.0002 to 0.01 mol of a salt selected from the group consisting of alkaline sodium salts and alkaline lithium salts of an inorganic acid per mol of said crude phthalic anhydride, said salt being further characterized in that a 0.1 molar solution thereof in distilled water has a pH above 7.5, at the boiling point of phthalic anhydride at atmospheric pressure for a period of at least 30 minutes without substantial loss of phthalic anhydride vapor and then separating phthalic anhydride from the mixture by fractional distillation at an absolute pressure below 500 millimeters of mercury, collecting and removing the first fraction, which contains colored impurities, and then collecting the remainder of the fractions, whereby a substantial portion of the phthalic anhydride is recovered in a substantially colorless and heat-stable form.

10. A method according to claim 9 wherein said salt is $Na_2CO_3$.

11. A method according to claim 9 wherein said salt is $Na_2SO_3$.

12. A method according to claim 9 wherein said salt is $Na_3PO_4$.

13. A method according to claim 9, but further characterized in that said salt is $NaHCO_3$.

14. A method according to claim 9, but further characterized in that said salt is $Na_2HPO_4$.

15. A method of purifying crude phthalic anhydride which consists in first distilling a crude phthalic anhydride which has been prepared by the vapor phase catalytic oxidation of naphthalene but has not been subjected to any antecedent chemical purification treatment, adding to the distilled phthalic anhydride from about 0.0002 to 0.01 mol of a salt selected from the group consisting of alkaline sodium salts and alkaline lithium salts of an inorganic acid per mol of said distilled anhydride, said salt being further characterized in that a 0.1 molar solution thereof in distilled water has a pH above 7.5, heating the resulting mixture at a temperature above 275° C. but not substantially in excess of the boiling point of phthalic anhydride at atmospheric pressure for a period of at least 30 minutes without substantial loss of phthalic anhydride vapor, and then fractionally distilling phthalic anhydride from the mixture at an absolute pressure below 500 millimeters of mercury, collecting and removing the first fraction, which contains colored impurities, and then collecting the remainder of the fractions, whereby a substantial portion of the phthalic anhydride is recovered in a substantially colorless and heat-stable form.

16. A method of purifying crude phthalic anhydride which consists in heating under reflux a mixture of (1) a crude phthalic anhydride which has been prepared by the vapor phase catalytic oxidation of naphthalene but has not been subjected to any antecedent chemical purification treatment and (2) from about 0.0002 to 0.01 mol of sodium carbonate per mol of said crude anhydride at the boiling point of phthalic anhydride at atmospheric pressure for a period of from 0.5 to 6 hours and then separating phthalic anhydride from said mixture by fractional distillation at an absolute pressure below 500 millimeters of mercury, collecting and removing the first fraction, which contains colored impurities, and then collecting the remainder of the fractions, whereby a substantial portion of the phthalic anhydride is recovered in a substantially colorless and heat-stable form.

ALBERT H. BUMP.
RALPH MAROTTA.
ROBERT D. SWISHER.

References Cited in the file of this patent

UNITED STATES PATENTS

| Number | Name | Date |
| --- | --- | --- |
| 1,728,225 | Bowers | Sept. 17, 1929 |
| 2,309,167 | Cooper | Jan. 26, 1943 |
| 2,356,449 | Engel | Aug. 22, 1944 |